(12) United States Patent
Tanaka et al.

(10) Patent No.: US 10,256,492 B2
(45) Date of Patent: Apr. 9, 2019

(54) FUEL CELL MEA WITH COMBINED METAL GAS DIFFUSION LAYER AND MICROPOROUS LAYER

(71) Applicant: UNIVERSITY OF CAPE TOWN, Cape Town (ZA)

(72) Inventors: Shiro Tanaka, Cape Town (ZA); Nabeel Hussain, Cape Town (ZA)

(73) Assignee: University of Cape Town, Cape Town (ZA)

( * ) Notice: Subject to any disclaimer, the term of this patent is extended or adjusted under 35 U.S.C. 154(b) by 59 days.

(21) Appl. No.: 15/129,964

(22) PCT Filed: Mar. 30, 2015

(86) PCT No.: PCT/IB2015/052332
§ 371 (c)(1),
(2) Date: Sep. 28, 2016

(87) PCT Pub. No.: WO2015/145406
PCT Pub. Date: Oct. 1, 2015

(65) Prior Publication Data
US 2017/0162893 A1    Jun. 8, 2017

(30) Foreign Application Priority Data
Mar. 28, 2014  (GB) .................................. 1405659.2

(51) Int. Cl.
| | | |
|---|---|---|
| *H01M 8/1065* | (2016.01) | |
| *H01M 8/1006* | (2016.01) | |
| *H01M 4/88* | (2006.01) | |
| *H01M 8/023* | (2016.01) | |
| *H01M 8/0232* | (2016.01) | |
| *H01M 8/0245* | (2016.01) | |

(Continued)

(52) U.S. Cl.
CPC ........ *H01M 8/1006* (2013.01); *H01M 4/8807* (2013.01); *H01M 8/023* (2013.01); *H01M 8/026* (2013.01); *H01M 8/0232* (2013.01); *H01M 8/0245* (2013.01); *H01M 8/1007* (2016.02); *H01M 8/0234* (2013.01); *H01M 2008/1095* (2013.01)

(58) Field of Classification Search
None
See application file for complete search history.

(56) References Cited

U.S. PATENT DOCUMENTS 6,783,883 B1 *   8/2004   Koschany ............... C25B 39/10
                                                          29/623.1
7,785,748 B2     8/2010   Zhang et al.
(Continued)

FOREIGN PATENT DOCUMENTS

JP    2002313359 A    10/2002

OTHER PUBLICATIONS

WO 2015/145406 Search Report.

*Primary Examiner* — Lucas J. O'Donnell
(74) *Attorney, Agent, or Firm* — Fay Sharpe LLP (57) ABSTRACT

The invention describes a membrane electrode assembly for use as a transport layer in polymer electrolyte fuel cells, the assembly comprising a porous metal gas diffusion layer (GDL) (20) and a catalyst layer (40) with a microporous layer (MPL) (30) interposed between them, the MPL (30) being constructed to fill the pores of the GDL (20) and coat the surface thereof.

8 Claims, 8 Drawing Sheets

(51) Int. Cl.
    *H01M 8/026*     (2016.01)
    *H01M 8/1007*     (2016.01)
    *H01M 8/0234*     (2016.01)
    *H01M 8/1018*     (2016.01)

(56) References Cited

U.S. PATENT DOCUMENTS

| | | | |
|---|---|---|---|
| 2004/0058223 A1* | 3/2004 | Shibata | H01M 4/8605 |
| | | | 429/480 |
| 2010/0028744 A1 | 2/2010 | Wieser et al. | |
| 2014/0080032 A1 | 3/2014 | Soboleva et al. | |

\* cited by examiner

[1] R. Flueckiger, F. Marone, M. Stampanoni, A. Wokaun, F.N. Buechi, Electrochim. Acta, 56, 2254 (2011)
[2] J. Eller, T. Rosen, F. Marone, M. Stampanoni, A. Wokaun, and F.N. Buechi J. Electrochem. Soc., 158, B963 (2011)

FIGURE 12 w/o any GDL

Fig. 13

Thinner C-GDL Case

Fig. 14

TABLE 1

| | GDL | | MPL | Performance | |
|---|---|---|---|---|---|
| | Type | Shape of Holes | in hole on surface | Voltage at 1 A cm$^{-2}$ | HFR |
| Example 1 | Commercial TGP-H060 | – | – CB | 0.57 V | 95 mΩ·cm$^2$ |
| Example 2 | Metal GDL | Round | – CB | 0.23 V | 70 mΩ·cm$^2$ |
| Example 3 | Metal GDL | Round | CB CB | 0.51 V | 70 mΩ·cm$^2$ |
| Example 4 | Metal GDL | Round | SF SF/CB | 0.62 V | 55 mΩ·cm$^2$ |
| Example 5 | Metal GDL | Rectangle | SF SF/CB | 0.61 V | 62 mΩ·cm$^2$ |
| Example 6 | Metal GDL Rigid ribs | Rectangle | SF SF/CB | 0.62 V | 48 mΩ·cm$^2$ |

CB: Carbon Black
SF: Silver Flake

FUEL CELL MEA WITH COMBINED METAL GAS DIFFUSION LAYER AND MICROPOROUS LAYER

TECHNICAL FIELD OF THE INVENTION

This invention relates to a novel metal gas diffusion layer structure and its combination with a novel microporous layer for use as a transport layer in polymer electrolyte fuel cells.

BACKGROUND OF THE INVENTION

The gas diffusion layer (GDL) is a porous and electrically conductive material located between the catalyst layers and bipolar plates of a polymer electrolyte fuel cell. Its primary function is to provide pathways for (1) reactant gases from the bipolar plate to the catalyst layer, and (2) product water from the catalyst layer to the bipolar plate. The GDL also assists with heat removal and provides mechanical support to the membrane. To further improve both gas and water transport and enhance electrical contact with the catalyst layer, a microporous layer (MPL) is applied to the GDL. In this configuration, the GDL consists of two layers: a macroporous carbon fiber substrate and a microporous composite layer. The MPL is typically composed of carbon black powder and a hydrophobic agent such as PTFE. The MPL prevents the formation of large liquid droplets close to the catalyst layer thereby preventing blockage of the catalyst sites to the incoming reactant gases (JPA_2002-313359). The MPL is typically prepared by mixing carbon black, PTFE and a solvent to create an ink which is applied onto the GDL. The applied layer is then dried at 350° C. to remove the solvent and sinter the PTFE particles.

Current commercial GDLs are made of randomly dispersed carbon fibers resulting in a very porous material with a random and wide pore size distribution. These GDLs have a three dimensional pore structure which has a high tortuosity. During fuel cell operation the porosity is reduced due to compression of the GDL and this leads to low gas permeability and poor gas distribution to the catalyst layer. Water can build up in the compressed pores leading to a phenomenon called GDL flooding. Flooding further prevents gases from reaching the catalyst layer.

Coating of the GDL with PTFE can reduce the build-up of water. The hydrophobic nature of the PTFE results in "fingering" or the formation of narrow water paths to the top surface of the GDL.

Adjacent to the GDL is the bipolar plate. The bipolar plate has a grooved channel and rib structure for reactant gases to flow. It also aids with heat removal from the catalyst layer. The reactant gas diffuses from the channels of the bipolar plate, through the gas diffusion layer and into the catalyst layer. Water generated in the catalyst layer moves towards the channels of the bipolar plate through the GDL. During high current fuel cell operation water tends to accumulate in the GDL areas which are in contact with the rib of the bipolar plate in the so called to "under-rib region". This water accumulation also leads to GDL flooding.

Current GDL-MPL technologies have low thermal conductivity and electric conductivity because of the high porosity and use of carbon as the core material. This results in higher than desired temperatures in the catalyst layer and membrane which can under certain operating conditions lead to catalyst layer and membrane dry out. Furthermore current GDL technologies have low rigidity such that when the GDLs are compressed during fuel cell operation, there is increased pressure on the GDL areas in contact with the ribs and minimal compression of the GDL areas in the "under-channel region". The result is poor contact of the GDL with the catalyst layer in certain areas which increases ohmic resistances and decreases fuel cell performance.

To address fuel cell flooding, Goebel (Journal of Power Sources 196 (2011) 7550-7554) reduced the bipolar plate rib width to enhance the water-removal and gas diffusion through the GDL. However reducing the rib width decreases the contact area between the rib and GDL which results in an increase in electronic resistance. Narrow ribs therefore require narrow channels but narrow channels have intrinsic problems of their own, namely higher pressure drop and greater chance of the channels filling up with water leading to channel flooding. The use of a metal GDL allows for the use of a narrow rib and relatively wide channel widths, since if the bipolar plate is also made of metal the contact area between a metal GDL and metal bipolar does not need to be as high as between a carbon GDL and the bipolar plate. The metal GDL therefore allows for the use of narrow ribs without resulting in an increase in electronic resistance. Metal GDLs in general possess significantly lower electronic resistance to carbon GDLs. The electron resistivity of stainless steel for example is $96 \times 10^{-6}$ $\Omega$m and that of conventional carbon GDL is $4.7\text{-}5.8 \times 10^{-1}$ $\Omega$m (http://www.torayca.com/lineup/composites/com_009.html#data).

Pure metal GDLs have pores which are of low tortuosity, probably approaching 1 but slightly increased due to manufacturing tolerances.

Figure 7:
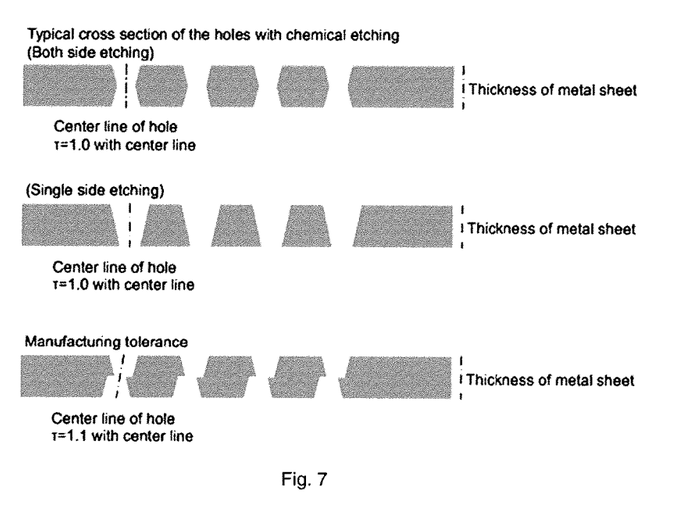
FIG. 7: is a cross section of a prior art pores in metal GDL's.

Pores in metal GDL's are typically constructed by means of chemical etching. This may be double-sided etching, or single sided etching as illustrated in the cross-sections referred to in FIG. 7:

By making use of chemical etching, the holes in the metal GDL are inherently straight especially for thin plates. Chemical etch is done with acid solution, and the acid is able to etch the metal almost straight. The tolerance is illustrated above. However the holes with this method are not inherently uniform in shape and size. The hole size or shape can be controlled with masking design (typically with a photoresist process).

PRIOR ART

Various prior art attempts at using metal GDLs made use of three dimensional metal GDL pore structures. These include US2014004441 A1, US2005250002 A1, WO2013172174 and CN102082277 A1.

Figure 8:
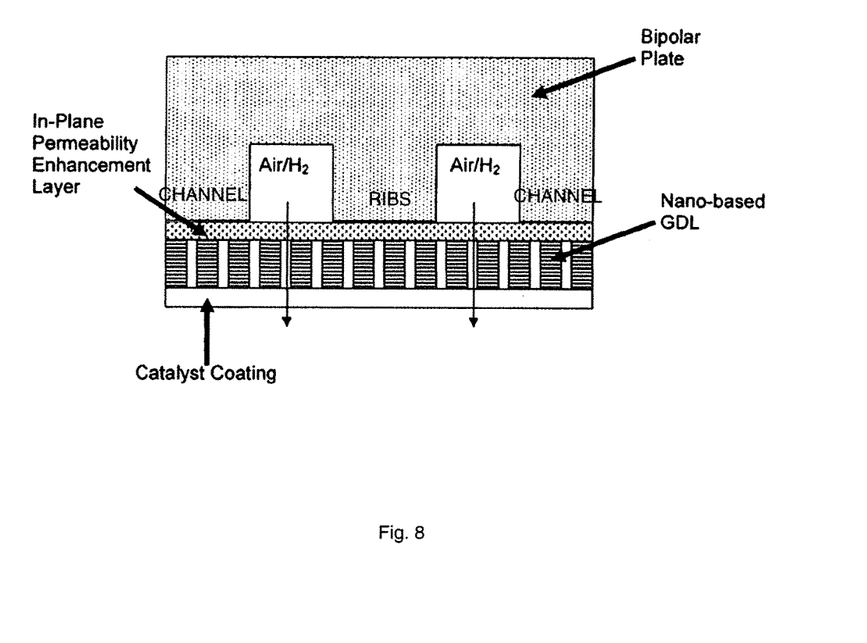
FIG. 8: Is an illustration of a prior Art metal GDL of U.S. Pat. No. 7,785,748 B2.
Figure 9:
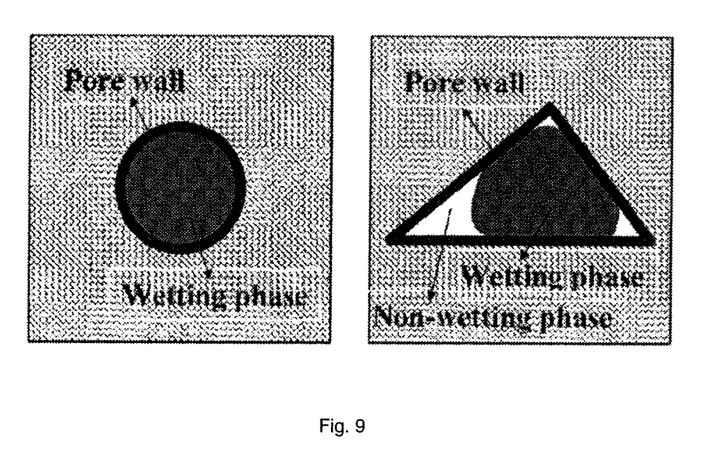
FIG. 9: Is a schematic showing the difference in effectiveness between circular and-non circular pores during wetting phase.

To the applicant's knowledge there has only been 1 patent filed prior to December 2013 that describes the use of a metal sheet for the GDL. Zhang et al. patented a metal GDL (U.S. Pat. No. 7,785,748B2) in 2010. The metal GDL had pores sizes in the range of 1 nm-300 μm. The GDL was coated with a self-assembling monolayer (SAM) for hydrophobic treatment. The metal material was any of aluminum, copper, platinum, tin, gold or silver. In addition to the metal GDL design an "In-plane permeability enhancement layer" was placed between the rib and the metal GDL as shown in FIG. 8. Zhang et al. claimed that a non-circular hole was preferable for liquid water and gas transport. Circular holes tend to fill up with liquid water whereas non-circular holes tend to be partially filled with liquid water allowing areas for gas to flow. This effect is shown in FIG. 9.

Figure 10:
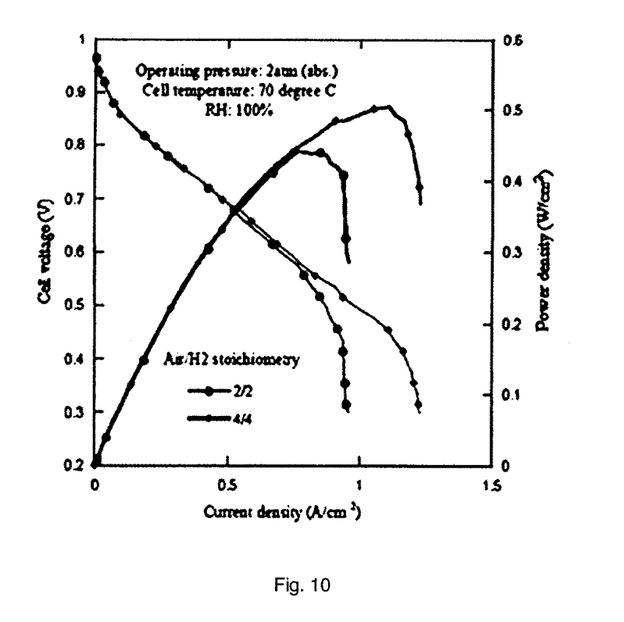
FIG. 10: Is a graph illustrating some of the problems faced with the prior art GDL of US778574 B2

The metal GDL presented by Zhang et al. has a few undesired properties and potential problems in a fuel cell environment. These include:

1. Liquid water tends to accumulate in all pores, even those containing the hydrophobic SAM material. There is insufficient space for gas to be transported and this would be even more of a problem at high current density operation where more water generated and more gas is required to be transported to the catalyst layer. This problem is shown in FIG. 10 where the performance drops rapidly at higher current density.

2. Catalyst sites are not exposed to reactant gases in the "under bridge region" of the metal GDL. The bridge refers to the area between successive pores of the metal GDL. In order for catalyst in contact with the bridge to be exposed to reactant gases, the diffusivity of the catalyst layer must be high and this is not possible in a catalyst layer which has small nanosized pores.

3. The "In-plane permeability enhancement layer" aids to distribute gas uniformly to each pore on the metal GDL, but it is also results in additional electronic resistance as a result of two contact resistances and a bulk material resistance. Furthermore there is a possibility of liquid water accumulating in this layer.

4. The metal GDL materials are any of aluminum, copper, platinum, tin, gold or silver. These metals are either very expensive or corrosive under fuel cell operating potentials, specifically at the cathode which can be up to 1.2 V. Some of these materials are also relatively soft at the proposed thicknesses so this can lead to poor distribution of pressure when compressed in a fuel cell environment. This leads to non-uniform pressure distribution and high electronic resistances.

It is therefor an object of this invention to provide a novel metal gas diffusion layer structure for use as a transport layer in polymer electrolyte fuel cells.

In this specification, tortuosity is taken to mean the ratio of the diffusivity in the free space to the diffusivity in the porous medium—it could also be described as the effective path length that a diffusing gas must travel relative to what it would travel in the free space.

Tortuosity by this meaning may be calculated as follows:

Tortuosity=(length of gas path along the centre lines of holes)/thickness of metal GDL).

A tortuosity of 1 would therefor describe a completely straight hole or pore with no tolerances.

THE INVENTION

According to the invention, a membrane electrode assembly comprises a porous metal gas diffusion layer (GDL) and a catalyst layer with a microporous layer (MPL) interposed between them, the (unfilled) pores of the GDL having a tortuosity of less than 1.5 and the MPL being constructed to fill the pores of the GDL and coat the surface thereof.

Where a catalyst layer is on the surface of a metal GDL, reactant gasses are supplied through the gas channels of the bipolar plate and then diffuse through the holes or pores of the metal GDL. Similar to problem 1 and 2 of the Zhang et al. invention, water can accumulate in the holes of the metal GDL and not all reactant gas is accessible to the catalyst layer as a result of the bridge of the metal GDL. Furthermore the ribs of the bipolar plate can fully or partially cover a pore of the metal GDL making it difficult for reactant gas to infiltrate the hole or for liquid water to leave the hole and exit the channel of bipolar plate.

Insertion of an MPL between the GDL and the catalyst layer addresses the issue of water accumulation. The MPL prevents accumulation of water at the interface of the catalyst layer and metal GDL and also enhances diffusion of gasses to the catalyst layer under the bridge area of the metal GDL. The filling of the pores of the GDL with the material of the MPL results in a further improvement in preventing water accumulation.

The MPL in this case may comprise a standard MPL design, made of carbon-black (CB) powder and polytetrafluoroethylene (PTFE) as described in JPA_2002313359. The CB/PTFE MPL forms nano-sized and hydrophobic pores. The pores prevent the growth of large liquid water droplets and limit the liquid water to small finger like particles (Journal of The Electrochemical Society, 151, A399-A406 (2004)).

The MPL is typically applied onto a standard carbon GDL in the form of ink containing water, CB and PTFE. The GDL/MPL is then sintered for 30 min at 350° C. The viscosity of the MPL ink is such that the dense fibers of GDL prevent the ink from penetrating into the GDL resulting in a layer on the surface of the GDL. If the same MPL ink is used in the case of the metal GDL, the ink will penetrate through the holes of the metal GDL (21). To fill the holes of the metal GDL and subsequently form a layer on the metal GDL, the viscosity of the MPL ink must be increased using a viscous agent like polyvinyl alcohol (PVA) resulting in an ink viscosity in the range of around 1000 cP~10000 cP. The viscous agent should be soluble in water and have decomposition temperature below 400° C. The glass transition temperature of PTFE is 320° C.~340° C., and the decomposition temperature of PTFE is approximately 420° C. The viscous MPL is coated on one side of metal using a doctor blade technique and by applying pressure during the application process. The pressure is needed to force the ink into the holes of the metal GDL.

To further enhance gas diffusion under the bridges of the metal GDL, an anisotropic flake based MPL is coated on the surface of the metal GDL and also made to fill the pores of the metal GDL. A conventional CB MPL is then coated on the surface of the anisotropic MPL. The anisotropic MPL is composed of flake-like shaped particles and PTFE and enhances gas diffusion due to its horizontal layered structure. The flake material can be carbon, silver or titanium flakes. During the application of the flake based MPL, the orientation of the flakes may become disordered due to the sheer stress of the doctor blade. In order to maintain the horizontal layered structure the flake MPL should be first be coated as a high viscous ink similar to the CB MPL and then again as a lower viscous ink in the range of 10 cP~1000 cP. The first coating forces the flake material into the metal GDL holes and the second coating at lower viscosity ensures the horizontal structure of the flakes is maintained in the final MPL layer. The dimensions of the flakes are in the micron range and as result the flake based MPL will have pores in the micron range as well. The larger pores compared to a conventional CB MPL can lead to larger water particles forming in the MPL. This is undesirable and can prevent reactant gases reaching the catalyst layer. To prevent this formation of larger liquid water particles a CB MPL was coated onto the flake based MPL such that the CB MPL is in contact with the catalyst layer. For the case where flake material is silver or titanium, the CB MPL prevents electrochemical corrosion of the metal flakes by acting as a barrier and preventing direct contact of the flakes with the catalyst layer.

In order to further improve gas diffusion through the metal GDL, a modification was made to the MPL design in the holes of the metal GDL. A larger particle MPL (232) was deposited in the holes of the metal GDL. The result is a 3-layer MPL design comprising a CB MPL next to the catalyst layer, an anisotropic flake based MPL on top of the metal GDL and a larger particle MPL in the holes of the metal GDL. The CB MPL prevents formation of large liquid water particles, the flake based MPL enhances gas diffusion horizontally under the bridge of the metal MPL, and the larger particle MPL enhances vertical gas diffusion through the holes of the MPL as a result of its larger pores. The relative pore sizes of the MPLs are CB MPL<flake MPL<larger particle MPL. The material for the larger particle MPL can be carbon, titanium or silver with particle diameter in range of 1 µm to 10 µm.

According to a further aspect of the invention, a membrane electrode assembly includes a porous metal gas diffusion layer comprising a repeating pattern of holes and bridges, the widths of the holes and bridges being determined relative to the widths of the channels and ribs of a bipolar plate of the electrodes in accordance with the following equations (1)-(3):

$$W_H \geq 2 \times W_B \quad (1)$$

$$2 \times (W_H + W_B) = L_C + L_R \quad (2)$$

$$L_C \geq L_R \quad (3)$$

Wherein $W_H$ and $W_B$ represent the width of the hole and the width of the bridge of the metal GDL whilst $L_C$ and $L_R$ represent width of the channel and the width of the rib respectively. Construction of the membrane electrode assembly MEA in accordance with the above results in a structure in which two thirds of the area of some of the holes of the metal GDL will be exposed to the channel area of the bipolar plate of the electrode and the remaining third of these holes will be covered by the rib of the bipolar plate. If the metal GDL and bipolar plate are then aligned correctly a repeating pattern is created such that there is one hole completely exposed to the channel next to the hole which is two thirds exposed to the channel area. These dimensions on the metal GDL and bipolar plate lead to better gas diffusion and more uniform gas supply to the catalyst layer.

In one form of the invention and to assist in better alignment of the metal GDL and bipolar plate the metal GDL should have at least one alignment aid, preferably in the form of a pin which aligns with a hole in the bipolar plate. The pin should be located on the bridge area of the metal GDL and the hole should be on the rib area of the bipolar plate. The location of the pin and hole should be within the active area of the MEA so that there is no effect on the gasket and sealing system.

The bridges of the metal GDL may further be provided with formations for engaging complimentary formations in the bipolar plate in abutment therewith. In one form the formations comprise ridges with complimentary grooves in the bipolar plate. Alternatively, the GDL may be provided with grooves to engage complimentary ridges in the bipolar plate. In the preferred form, the formations on the metal GDL are orientated at right angles to the channels of the bipolar plate.

With this configuration the ridges enhance the rigidity of the metal GDL resulting in a more uniform pressure distribution from the bipolar plate onto the catalyst layer. More uniform pressure reduces the contact resistances between the catalyst layer, CB MPL, flake based MPL and larger particle MPL. To improve contact between the metal MPL with the ridges and the bipolar plate, the bipolar plate should have grooves on the rib area which align with the ridges on the metal GDL This design can however result in the ridges trapping liquid water in the channels of the bipolar plate. To mitigate this, the fuel cell should be configured such that the channels are lying vertically to ensure that gas flows downwards and liquid water removal is assisted by gravity.

It should be noted that the design of the metal GDL based system for species transport can easily be modified and tailored for different operating conditions and applications.

This is not the case with current carbon based GDLs which consist of relatively random carbon fibers. For low humidity or dry operation, the hole area of metal GDL can be made smaller to prevent the MPL from removing water quickly and in doing do prevent dry out of the membrane. For automotive applications where the fuel cell operates at high currents and subsequently very wet conditions, the hole area can be made larger to improve water removal and prevent the flooding. Additionally the rib width of the bipolar plate can be further reduced so more holes of the metal GDL are exposed to channel area and therefore the reactant gases. This is only possible with the metal GDLs since the contact resistance of the metal GDL with the bipolar plate is not affected as much as between a carbon GDL and bipolar plate when the rib width is decreased. Metal GDL also have higher thermal conductivities than carbon based GDLs and so can be used for higher temperature polymer electrolyte fuel cells. The metal GDLs will transfer heat from the catalyst layer to the coolant channels of the fuel cell more effectively than carbon based GDLs.

This design can however result in the ridges trapping liquid water in the channels of the bipolar plate. To mitigate this, the fuel cell should be configured such that the channels are lying vertically to ensure that gas flows downwards and liquid water removal is assisted by gravity.

Also in a preferred form of the invention, the active area of the bipolar plates is coated with a 1 µm thick gold layer to prevent corrosion of the metallic GDL within the acidic fuel cell environment and also improves the contact between the bipolar plate and the and the GDL.

The reduction of water flooding by filling the pores of the GDL with material of the MPL is a surprising result but may be justified with the argument below.

There are three hurdles to be overcome in making use of a metal GDL operate without water flooding.

Firstly, water accumulation in the holes in the GDL needs to be avoided. Secondly, it is a challenge to align the holes and the channel/land position and finally, utilization of catalyst under the land region, where holes are covered by land, needs to be optimized.

The holes in a pure metal GDL are typically larger than those found in a normal or carbon GDL. As a result, water tends to accumulate within the holes and forms large droplets resulting in the plugging of the straight (non-tortuous) holes even if the surface is coated with PTFE. This has been shown to be avoided by filling the holes with nanocarbon and PTFE in accordance with the invention.

The second and third hurdles can only really be addressed once water accumulation has been avoided.

When operating at the ten micron size level, it is difficult to align the holes in the GDL with the land/channel design of the bipolar plate, despite considerable care. It was discovered that if uniform patterning of the holes is sufficient to permit flood-free operation of the MEA, it can substantially reduce the cost of the M-GDL and fuel cell production.

Figure 11:
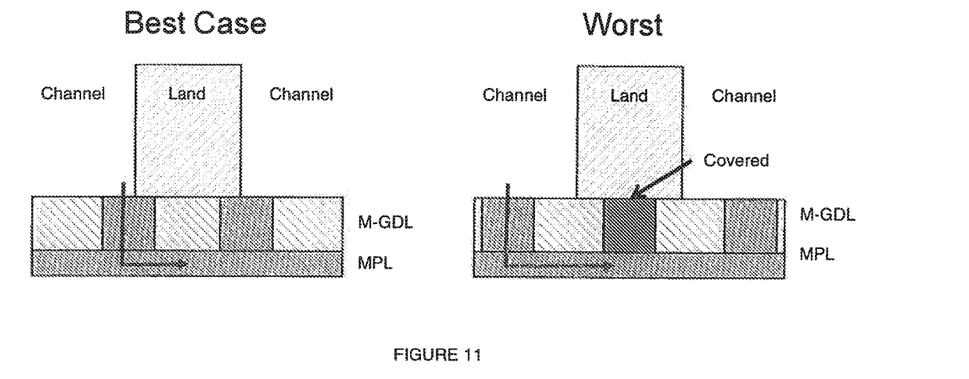
FIG. 11; is a schematic depicting best and worst case scenarios in aligning the holes in the GDL of the invention with the land/channel design of the bipolar plate.

Referring to FIG. 11, it will be noted that in the best case where the land does not cover a hole in the bipolar plate, the diffusion path length is short. Even in the worst case scenario, where a hole is covered, the diffusion path length is slightly longer than that of the land width using the GDL construction which is the subject of this patent. The water is retained in a narrow path through the MPL-coated and filled pores of the metal GDL due to the hydrophobic nature of the PTFE coating and the structural effect of nano sized carbon and nano pore sizes.

In addition, the tortuosity being less than 1.5 assists in achieving the shortest diffusion length (and probably also prevents wide spreading of the water) and therefor on a nano scale, keeps the pore size through the MPL straight and uniform.

Figure 12:
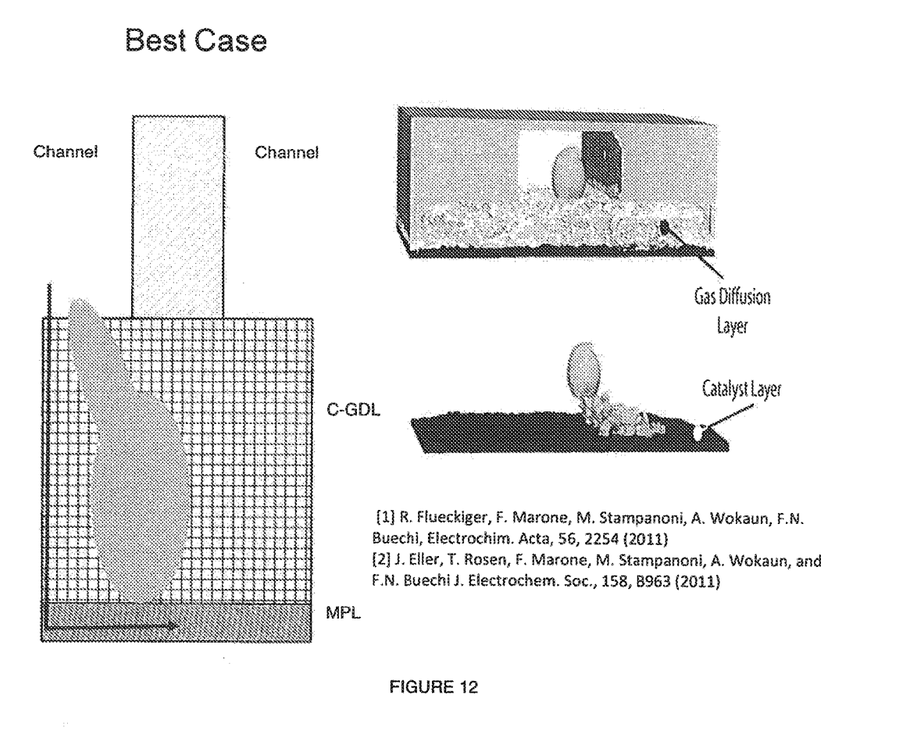
FIG. 12; is a schematic of a conventional GDL as known in the art, illustrating the reduced diffusivity of the gas to the catalyst layer.

Referring to FIG. 12, in the case of a conventional GDL, the thickness of the GDL is greater and water is spread widely, even with a PTFE treatment. This is because the pore size is substantially larger (sub-mm rather than nano-sized). This effect reduces the diffusivity of the gas to the catalyst layer.

Figure 13:
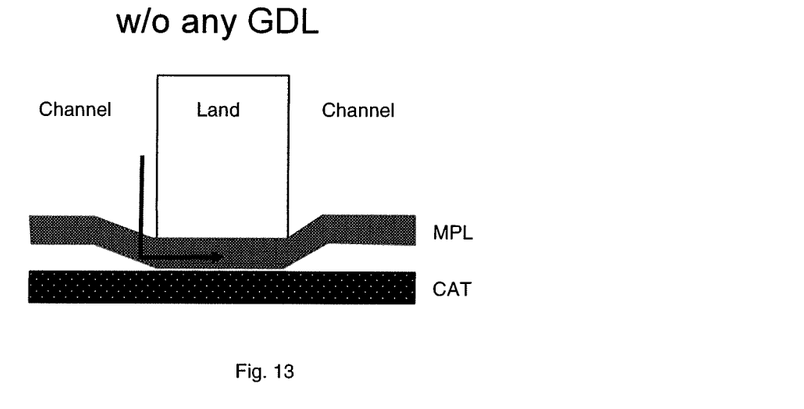
FIG. 13; is a schematic illustrating the effect of no GDL on diffusion.

Referring to FIG. 13, in a scenario where no GDL is present, the diffusion may be comparable to that achieved with a metal GDL as proposed here-in, but contact resistance between the MPL and catalyst layer is increased dramatically because of the lack of contact pressure on this region. Aside from the increased resistance, this arrangement would have insufficient strength to withstand the pressure differential and mechanical stress.

Figure 14:
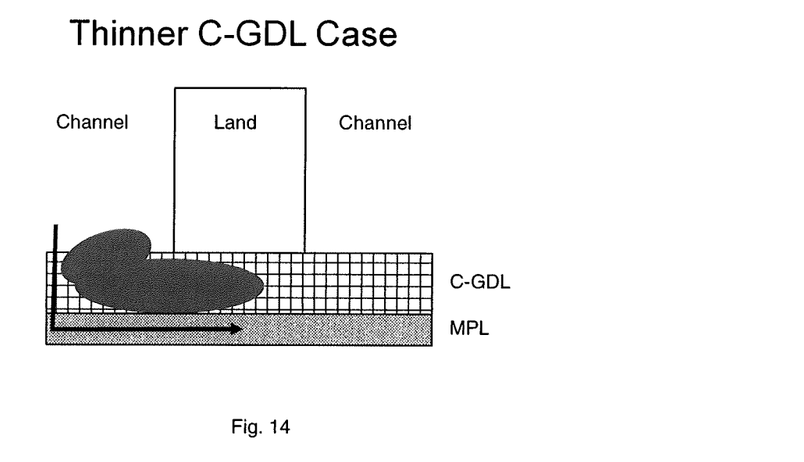
FIG. 14; is a schematic illustrating the effect of a thinner Carbon GDL layer on gas diffusion.

On the contrary, and referring to FIG. 14 where a thinner carbon GDL is used, the diffusion may be better than that in a standard thickness C-GDL, but the thinner C-GDL also has a wider water path, high electron contact resistance, lower rigidity and lower mechanical stress.

If a thinner C-GDL were to be filled with a hydrophobic MPL, the water can be retained in a similar path or wider, and diffusion may be kept similar or lower compared to a metal GDL of the same thickness. This is because the mixture of sub-mm and nano-size pores gives a wider pore distribution and results in a wider water path. Thus the combination of a Highly tortuous C-GDL and an MPL coating of its pores, makes for a more complicated gas diffusion path. In addition, the main strength is retained by the C-GDL so the contact resistance and mechanical strength is lower than that of the metal GDL of this invention.

EMBODIMENTS OF THE INVENTION

Embodiments of the invention are described below with reference to the accompanying drawings and examples:

FIG. 15: is a Table ("Table 1") summarizing fuel cell performance and high frequency resistance (HFR) of different metal GDL-MPL designs In FIG. 1, the basic construction of a membrane electrode assembly (MEA) is shown to comprise a fuel cell bipolar plate (10), metal GDL (20) and catalyst layer (40). The catalyst layer is on the surface of the metal GDL. The reactant gases are supplied through the gas channels (12) of the bipolar plate (10) and then diffuse through the holes or pores (21) of the metal GDL. Similar to problem 1 and 2 of the Zhang et al. invention, water can accumulate in the hole (21) of the metal GDL and not all reactant gas is accessible to the catalyst layer (40) as a result of the bridge (22) of the metal GDL. Furthermore the ribs (11) of the bipolar plate can fully or partially cover a pore (21) of the metal GDL making it difficult for reactant gas to enter the hole or for liquid water to leave the hole and enter the channel of the bipolar plate.

Figure 1:
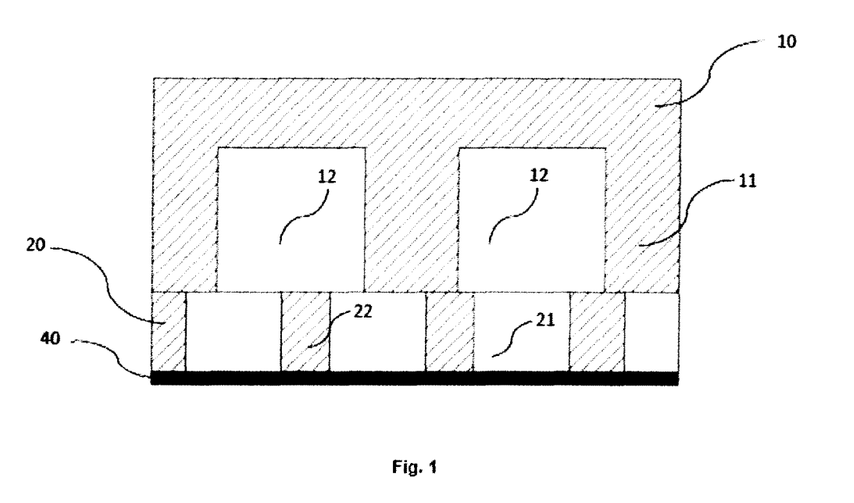
FIG. 1: is a cross-sectional schematic of fuel cell bipolar plate, metal GDL and catalyst layer
Figure 2:
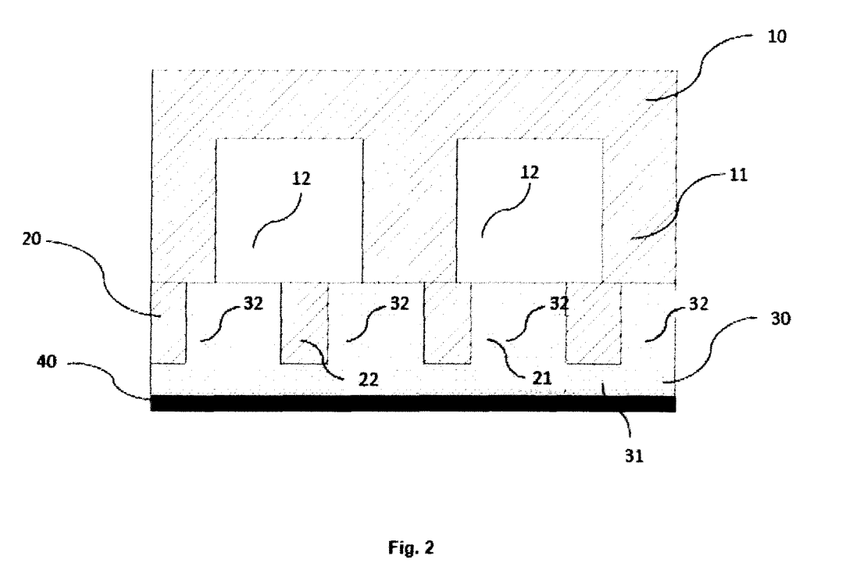
FIG. 2: is a cross-sectional schematic of fuel cell bipolar plate, metal GDL, carbon black MPL on the surface and in the holes of metal GDL, and catalyst layer according to the invention.

FIG. 2 illustrates an improvement on the construction of the MEA as shown in FIG. 1, according to the invention and which addresses the issue of water accumulation. A MPL (30) was inserted between the catalyst layer (40) and the metal GDL (20). The area of the MPL (31) prevents accumulation of water at the interface of the catalyst layer and metal GDL and also enhances diffusion of gasses to the catalyst layer under the bridge (22) area of the metal GDL. To further prevent water accumulation the holes of metal GDL were also filled with the MPL material (32). The MPL in this case is a standard MPL design, made of carbon-black (CB) powder and polytetrafluoroethylene (PTFE). The CB/PTFE MPL forms nano-sized and hydrophobic pores. The pores prevent the growth of large liquid water droplets and limit the liquid water to small finger like particles as has been illustrated in prior art.

The MPL is typically applied onto a standard carbon GDL in the form of ink containing water, CB and PTFE. The GDL/MPL is then sintered for 30 min at 350° C. The viscosity of the MPL ink is such that the dense fibers of GDL prevent the ink from penetrating into the GDL resulting in a layer on the surface of the GDL. If the same MPL ink is used in the case of the metal GDL, the ink will penetrate through the holes of the metal GDL (21). To fill the holes of the metal GDL and subsequently form a layer on the metal GDL, the viscosity of the MPL ink must be increased using a viscous agent like polyvinyl alcohol (PVA) resulting in an ink viscosity in the range of around 1000 cP~10000 cP. The viscous agent should be soluble in water and have decomposition temperature below 400° C. The glass transition temperature of PTFE is 320° C.~340° C., and the decomposition temperature of PTFE is approximately 420° C. The viscous MPL is coated on one side of metal using a doctor blade technique and by applying pressure during the application process. The pressure is needed to force the ink into the holes of the metal GDL.

Figure 3:
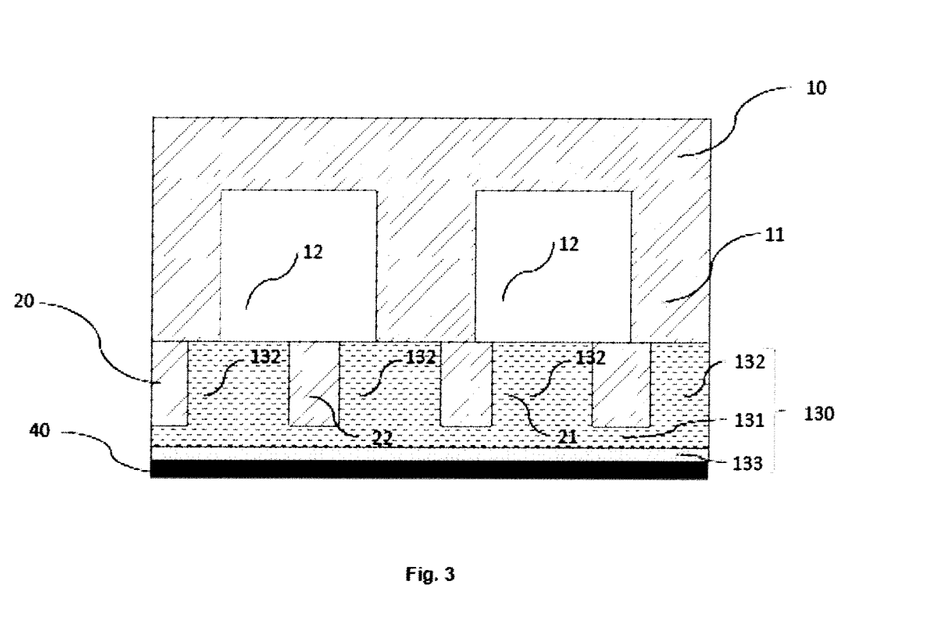
FIG. 3: is a cross-sectional schematic of fuel cell bipolar plate, metal GDL, flake based MPL on the surface and in the holes of metal GDL, a second carbon black MPL on the flake based MPL, and catalyst layer, according to the invention.

Turning now to FIG. 3, a further improvement in the MEA construction is shown which enhances gas diffusion under the bridges (22) of the metal GDL. In this form of the invention, an anisotropic flake based MPL (130) is coated on the surface of the metal GDL and also made to fill the pores of the metal GDL. A conventional CB MPL is then coated on the surface of the anisotropic MPL. The anisotropic MPL is composed of flake like shaped particles and PTFE and enhances gas diffusion due to its horizontal layered structure. The flake material can be carbon, silver or titanium flakes. During the application of the flake based MPL, the orientation of the flakes may become disordered due to the sheer stress of the doctor blade. To maintain the horizontal layered structure the flake MPL should be first be coated as a high viscous ink similar to the CB MPL and then again as a lower viscous ink in the range of 10 cP~1000 cP. The first coating forces the flake material into the metal GDL holes and the second coating at lower viscosity ensures the horizontal structure of the flakes is maintained in the final MPL layer (131). The dimensions of the flakes are in the micron range and as result the flake based MPL will have pores in the micron range as well. The larger pores compared to a conventional CB MPL can lead to larger water particles forming in the MPL. This is undesirable and can prevent reactant gases reaching the catalyst layer. To prevent this formation of larger liquid water particles a CB MPL (133) is coated onto the flake based MPL such that the CB MPL is in contact with the catalyst layer. In situations where the flake material is silver or titanium, the CB MPL prevents electrochemical corrosion of the metal flakes by acting as a barrier and preventing direct contact of the flakes with the catalyst layer.

Figure 4:
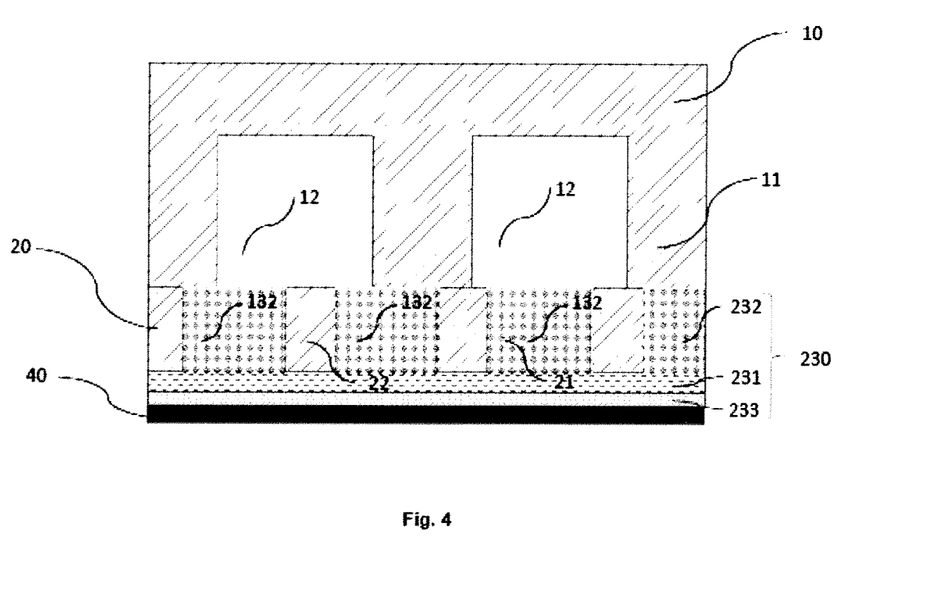
FIG. 4: is a cross-sectional schematic of fuel cell bipolar plate, metal GDL, 3 layer MPL design consisting of (i) larger particle MPL in metal GDL holes, (ii) flake based MPL on surface of metal GDL and (iii) carbon black MPL on flake based MPL, and catalyst layer, according to the invention.

FIG. 4 shows a modification to the MPL design of FIG. 3 which permits improved gas diffusion through the metal GDL. The modification results in larger pores in the MPL which enhances gas diffusion horizontally. In this form of the invention, a larger particle MPL (232) was deposited in the holes of the metal GDL. The result is a 3-layer MPL design comprising a CB MPL next to the catalyst layer (233), an anisotropic flake based MPL on top of the metal GDL (231) and a larger particle MPL (232) in the holes of the metal GDL. The CB MPL prevents formation of large liquid water particles; the flake based MPL enhances gas diffusion horizontally under the bridge of the metal MPL, and the larger particle MPL enhances vertical gas diffusion through the holes of the MPL as a result of its larger pores. The relative pore sizes of the MPLs are CB MPL<flake MPL<larger particle MPL. The material for the larger particle MPL may be carbon, titanium or silver with particle diameter in range of 1 μm to 10 μm.

Figure 5:
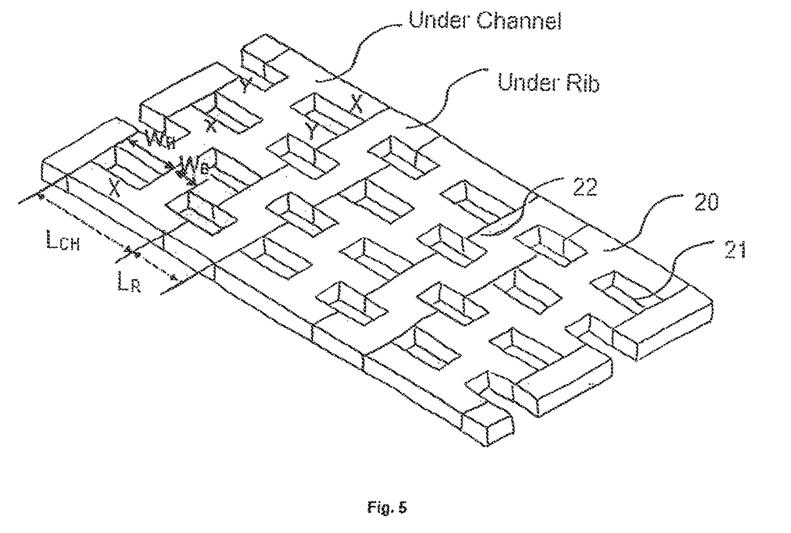
FIG. 5: is a schematic of hole and bridge dimensions of the metal GDL as presented in equations (1)-(3), according to the invention.

In FIG. 5, the gas diffusion from the bipolar plate to the catalyst is addressed by modifying the relative dimensions of the metal GDL and bipolar plates. A specific arrangement of rectangular holes in the metal GDL is provided which results in improved gas diffusion and more uniform gas supply to the catalyst layer.

In FIG. 5, the contact areas of the land and rib of the bipolar plate on the metal GDL, referred to as 'Under Channel' and 'Under Rib' respectively. $W_H$ and $W_B$ represent the width of the hole and the width of the bridge of the metal GDL whilst $L_C$ and $L_R$ represent width of the channel and the width of the rib respectively. If these dimensions follow equations (1)-(3) then two thirds of the area of some of the holes (21) of the metal GDL will be exposed to the channel area (12) of the bipolar plate (10) and the remaining third of these holes will be covered by the rib (11) of the bipolar plate (10). If the metal GDL and bipolar plate are then aligned correctly a repeating pattern is created such that there is one hole (X) completely exposed to the channel next to the hole (Y) which is two thirds exposed to the channel area. These dimensions on the metal GDL and bipolar plate lead to better gas diffusion and more uniform gas supply to the catalyst layer.

Referring back to FIG. 2, and for better alignment of the metal GDL and the bipolar plate, the metal GDL (20) should have at least one pin (50) which registers with a hole (60) in the bipolar plate (10). The pin (50) should be located on the bridge area (22) of the metal GDL and the hole (60) should be on the rib area (11) of the bipolar plate (10). The location of the pin and hole should be within the active area of the MEA so that there is no effect on the gasket and sealing system.

Figure 6:
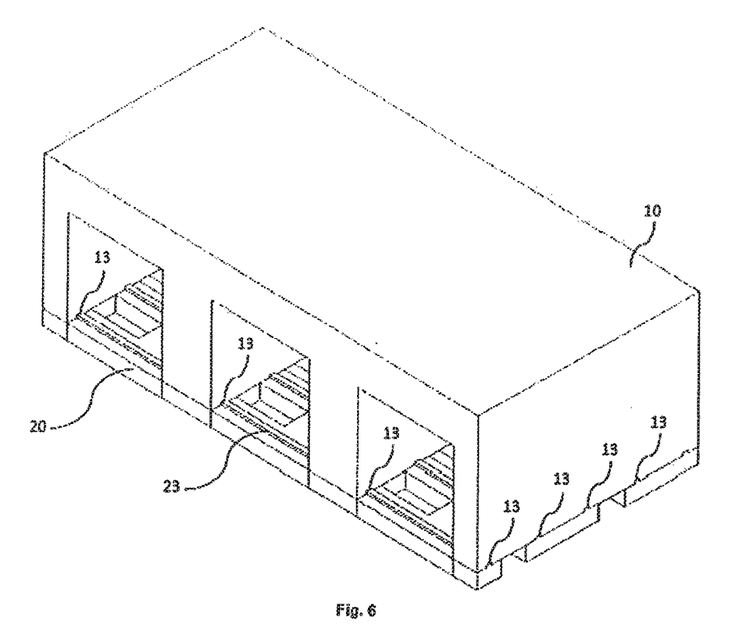
FIG. 6: is a schematic showing enhanced rigidity of the metal GDL as a result of ridges on the metal GDL and corresponding grooves on the ribs of the bipolar plate, according to the invention.

FIG. 6 shows how the compression pressure distribution onto the catalyst layer can be improved. The metal GDL can be made to have ridges (23) on top of the bridge areas. The ridges (23) on the metal GDL (20) should be at right angles to the channels of the bipolar plate (10). With this configuration the ridges enhance the rigidity of the metal GDL resulting in a more uniform pressure distribution from the bipolar plate onto the catalyst layer. More uniform pressure reduces the contact resistances between the catalyst layer, CB MPL, flake based MPL and larger particle MPL. To improve contact between the metal MPL with the ridges and the bipolar plate, the bipolar plate (10) should have grooves (13) on the rib area which align with the ridges on the metal GDL. This design can however result in the ridges trapping liquid water in the channels of the bipolar plate. To mitigate this, the fuel cell should be configured such that the channels are lying vertically to ensure that gas flows downwards and liquid water removal is assisted by gravity.

EXAMPLES

Figure 15:
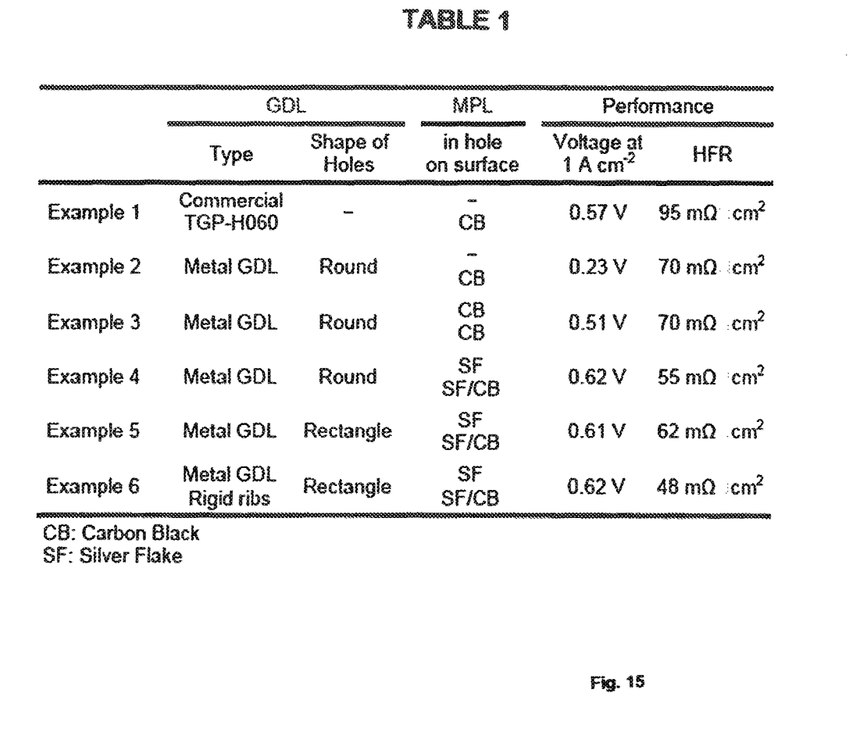

The following examples illustrate the construction and testing of the various embodiments of the invention with the results of the testing being provided in Table 1 of FIG. 15.

Preparation of Catalyst Coated Membrane (CCM) and Membrane Electrode Assembly (MEA)

Catalyst ink was first prepared by mixing 40 wt % platinum on carbon catalyst (HySA-V40, Mintek, South Africa) Nafion solution (5 wt % ionomer, Ion Power, United States), isopropanol (Sigma-Aldrich) and ultrapure water. The ratio of carbon to ionomer in the ink was 0.65 and the solids content of the ink was 20 wt %. The mixed ink was spray coated onto 125 micron Teflon sheets using a USI Prism 300 ultrasonic spray coater. The coated Teflon sheets were then dried in an oven at 80° C. for 3 hours. The Pt loadings on the coated substrate was 0.4 mg/cm$^2$ Following the drying step two coated Teflon sheets were hot-pressed on either side of Nafion-XL membrane (Ion Power, United States) using a manual Carver hot-press at 135° C. and 10 MPa for 10 min. The resultant CCM with an active area of 15 cm$^2$ (3 cm×5 cm) was then combined with different GDL-MPL cases as described in the various examples to follow. A fresh CCM was used for each GDL-MPL case.

Fuel Cell Testing

MEAs were evaluated in a single fuel cell set up consisting of bipolar plates and endplates. The bipolar plates had channels of length 50 mm, depth 0.1 mm and width 0.2 mm, and ribs of length 50 mm, height 0.1 mm, and width 0.1 mm. The active area of the bipolar plates was gold-plated resulting in a 1 μm thick gold layer on the bipolar plate. The fuel cell was operated at a cell temperature of 80° C., ambient pressure, hydrogen/air at constant flowrates of 0.5 NL/min and 1.0 NL/min respectively and a relative humidity of 100%.

Polarization curve and 1 kHz high frequency resistance (HFR) measurements were measured using a FuelCon test station. Table 1 of FIG. 15 summarizes the cell voltage at 1 A cm$^{-2}$ and the HFR for the following different examples.

Example 1

Commercial GDL/MPL

A CCM was combined with a commercial GDL with MPL (TGP-H60, Toray, Japan). The GDL is a carbon fiber based paper material and the MPL is made of carbon black and PTFE.

Example 2

Metal GDL with CB MPL on the Surface of the Metal GDL

A CCM was combined with a metal GDL with a CB MPL on the surface of the metal GDL. The metal GDL was manufactured by Meltec Corp. (Japan) and consisted of circular holes of diameter 70 μm and bridges between the holes of width 30 μm. The holes were chemically etched on a 30 μm thick stainless steel (SS316L) foil and gold-plated to leave a 1 μm thick gold layer on the surface of the stainless steel. The CB MPL was coated by a doctor blade technique on the surface of the metal GDL using a low viscous MPL ink. The low viscosity ensures the MPL is only on the surface of the metal GDL and not in the holes. The MPL ink was prepared using CB powder (acetylene black from Sigma-Aldrich), PTFE emulsion (Fuel Cell Earth), surfactant (TRITON X-114 from Sigma-Aldrich) and ultrapure water in a weight ratio of 4:1:8:80. Following coating of the MPL, the metal GDL with MPL was sintered at 350° C. for 1 hour.

Example 3

Metal GDL with CB MPL on the Surface and in the Holes of the Metal GDL

A CCM was combined with a metal GDL with a CB MPL on the surface and in the holes of the metal GDL. The CB MPL was coated on the surface of the metal GDL and forced into the holes of metal GDL using the doctor blade technique with a viscous MPL ink and by applying a 20 kg load on the doctor blade. The MPL ink was prepared using CB powder (acetylene black from Sigma-Aldrich), PTFE emulsion (Fuel Cell Earth), surfactant (TRITON X-114 from Sigma-Aldrich), PVP (Sigma-Aldrich) and ultrapure water in a weight ratio of 4:1:8:4:4. Following coating of the MPL, the metal GDL with MPL was sintered at 420° C. for 1 hour.

Example 4

Metal GDL with Flake Based MPL on the Surface and in the Holes of the Metal GDL and Second CB MPL on the Flake Based MPL A CCM was combined with a metal GDL with a flake based MPL on the surface and in the holes of the metal GDL and a CB MPL on the surface of the flake based MPL. The flake material was silver and the flake MPL was coated on the surface of the metal GDL and forced into the holes of metal GDL using the doctor blade technique with a viscous MPL ink and by applying a 20 kg load on the doctor blade. The MPL ink was prepared using silver flakes (10 μm diameter and 1 μm thickness from Sigma-Aldrich), PTFE emulsion (Fuel Cell Earth), PVP (Sigma-Aldrich) and ultrapure water in a weight ratio of 20:1:8:4. Surfactant was not required for silver flakes due to the large particle size. Following coating of the MPL, the metal GDL with MPL was sintered at 420° C. for 1 hour.

Example 5

Metal GDL with MPL Design as Per Example 4 and Metal GDL and Bipolar Dimensions as Per Equations (1)-(3)

A CCM was combined with a metal GDL with new dimensions and with an MPL design as per example 4. The metal GDL was manufactured by Meltec Corp. (Japan) and consisted of rectangular shaped holes with dimensions of 100 μm×50 μm and bridges between the holes of width 50 μm. The arrangement of the holes is shown in FIG. 5. The holes were chemically etched on a 30 μm thick stainless steel (SS316L) foil and gold-plated to leave a 1 μm thick gold layer on the surface of the stainless steel. A silver flake MPL and CB MPL were added as per example 4.

Example 6

Metal GDL as Per Example 5 with Added Ridges on the Metal GDL for Higher Rigidity A CCM was combined with a metal GDL as per example 5 with additional ridges and with an MPL design as per example 4. The metal GDL was manufactured in the same way as per example 5 except that prior to the gold plating step, another stainless steel (SS316L) foil of 50 μm thickness was welded onto the metal GDL using a diffusion welding technique. The combined stainless steel sheet was then chemical etched from the flat side leaving ridges of height 50 μm and width 25 μm. The metal GDL with ridges was then gold plated as per examples 2-5. A silver flake MPL and CB MPL were added as per example 4. The surface of the ribs of bipolar plates was also chemically etched for the testing of this example. The etching resulted in grooves of depth 50 μm on the bipolar plate. The grooves on the bipolar plate were then aligned to the ridges of the metal GDL as shown in FIG. 6.

Results

The results are summarized in Table 1. Example 1 showed no mass transfer limitations and flooding (relatively high voltage at 1 A cm$^{-2}$) but a high HFR. The narrow ribs on the bipolar plate enhanced the gas diffusion under the ribs reducing mass transfer limitations. However the narrow ribs also result in less contact of the bipolar plate with the carbon GDL increasing the contact resistance.

Examples 2 and 3 show similar HFR but example 2 shows a much lower voltage at 1 A cm$^{-2}$. The similar HFR results from very similar metal GDL-MPL designs. The HFR is lower than example 1 as the contact between metal GDLs and the narrow ribs of the bipolar plate is better than for carbon GDLs. The low voltage for example 2 indicates severe mass transfer limitations as a result of flooding. The different between example 2 and 3 is the presence of CB MPL in the holes of the metal GDL. In the absence of the CB MPL in the holes as in example 2, liquid water will accumulate in the holes leading to flooding. For example 3 the voltage at 1 A cm$^{-2}$ is much better than in example 2 indicating that the CB prevents liquid water build up in the holes.

Example 4 showed a lower HFR and higher voltage than examples 1-3. This is because the silver flake based MPL has a higher conductivity than the CB MPL. The improved voltage is as a result of the horizontal arrangement of the silver flakes. The horizontal arrangement enhances gas diffusion especially under the bridge areas of the metal GDL.

Example 5 shows a very similar result to example 4. The rectangular holes of the metal GDL with larger openings as used in example 5 should result in better gas diffusion but this does not show up in the voltage at 1 A cm$^{-2}$. The slightly higher HFR in example 5 is because of larger holes in the metal GDL and therefore less contact of the metal GDL area with the ribs of the bipolar plate.

Example 6 shows a much lower HFR than example 5. The ridges help to uniformly distribute the compression pressure onto the active area and as a result this will reduce the contact resistances between catalyst layer, MPL, metal GDL and bipolar plate.

The invention claimed is:

1. A membrane electrode assembly comprising a bipolar plate comprising a series of ribs and channels, a porous metal gas diffusion layer (GDL) having a tortuosity of less than 1.5, and a catalyst layer, with a microporous layer (MPL) interposed between the GDL and the catalyst layer, wherein the porous metal gas diffusion layer comprises a repeating pattern of holes and bridges, the widths of the individual holes and bridges being defined by the following equations (1)-(3):

$$W_H \geq 2 \times W_B \quad (1)$$

$$2 \times (W_H + W_B) = L_C + L_R \quad (2)$$

$$L_C \geq L_R \quad (3)$$

and wherein $W_H$ represents the width of the holes and $W_B$ represents the width of the bridges of the metal GDL and $L_C$ represents the width of the channels and $L_R$ represents the width of the ribs of the bipolar plate of the electrode respectively.

2. A membrane electrode assembly according to claim 1 wherein the metal GDL and bipolar plate include an alignment aid in the form of one or more complimentary engaging and mating formations, which when in register ensure correct alignment of the metal GDL with the bipolar plate.

3. A membrane electrode assembly according to claim 2 wherein the complimentary engaging and mating formations comprise a pin and a hole for receiving the pin.

4. A membrane electrode assembly according to claim 2 wherein the alignment aid is located within the active area of the membrane electrode assembly.

5. A membrane electrode assembly according to claim 2 wherein the complementary engaging and mating formations are located on abutting surface of the bridges of the metal gas diffusion layer and the ribs of the bipolar plate.

6. A membrane electrode assembly according to claim 5 wherein the complementary engaging and mating formations comprise ridges on one surface and complimentary grooves on the other surface in abutment therewith, wherein the formations are orientated at right angles to the channels of the bipolar plate.

7. A polymer electrolyte fuel cell including a membrane electrode assembly according to claim 1.

8. A membrane electrode assembly according to claim 3 wherein the pin is located on the bridge area of the metal GDL and the corresponding hole is located on the rib area of the bipolar plate.

* * * * *